United States Patent
Guo et al.

(10) Patent No.: US 7,251,827 B1
(45) Date of Patent: Jul. 31, 2007

(54) IN-LINE SIGN IN

(75) Inventors: Michael Wei-Quiang Guo, Bellevue, WA (US); Jonathan P. Horton, Woodinville, WA (US)

(73) Assignee: Microsoft Corporation, Redmond, WA (US)

(*) Notice: Subject to any disclaimer, the term of this patent is extended or adjusted under 35 U.S.C. 154(b) by 1036 days.

(21) Appl. No.: 10/137,019

(22) Filed: May 1, 2002

(51) Int. Cl.
*G06F 7/04* (2006.01)
*G06F 7/58* (2006.01)

(52) U.S. Cl. ............................................. 726/8; 726/10

(58) Field of Classification Search ................ 726/8, 726/10
See application file for complete search history.

(56) References Cited

U.S. PATENT DOCUMENTS 6,412,009 B1 * 6/2002 Erickson et al. ............ 709/228
6,535,294 B1 * 3/2003 Arledge et al. ............ 358/1.15

OTHER PUBLICATIONS

Korman (David P. Kormann and Aviel D. Rubin, Computer Networks, Elsevier Science Press, vol. 33, pp. 51-58, 2000).*
HotMail (http://web.archive.org/web/20000815062816/lc4.law5.hotmail.passport.com/cgi-bin/login).*
Kaeo (Merike Kaeo, "Designing Network Security", ISBN: 1578700434, 1999), p. 46-47.*
Stallings (Stallings (William Stallings, "Cryptography and network security", 2th edition, 1998, ISBN: 0138690170), p. 329-335.*
HotMail (http://web.archive.org/web/20000815062816/lc4.law5.hotmail.passport.com/cgi-bin/login), 2000.*
Stallings (Stallings (William Stallings, "Cryptography and network security", 2th edition, 1998, ISBN: 0138690170), p. 329-335.*
Marable, B., et al., "Designing smart pop-up windows," *Web Techniques*, Jul. 1998, 65-69.
Tessier, T., "Sharing data between web page frames using JavaScript," *Dr. Dobb's Journal*, May 1996, 72-72, 74-75, 86-87.
Veer, E.A.V., Client-side JavaScript, JavaScript lets you keep client functions on the client, *Web Techniques*, Feb. 1997, 52.
U.S. Appl. No. 09/349,619, filed Jul. 8, 1999, Howard, et al.
U.S. Appl. No. 09/350,018, filed Jul. 8, 1999, Howard, et al.

* cited by examiner

*Primary Examiner*—Kambiz Zand
*Assistant Examiner*—Peter Poltorak
(74) *Attorney, Agent, or Firm*—Woodcock Washburn LLP (57) ABSTRACT

A method of in-line sign in that allows a user to sign into a first server based on a sign-in methodology of a second server is disclosed. The method uses, among other things, a nonce and approved URL list to prevent spoofing and replay attack. Additionally, the method allows error messages that occur during the authentication process to be displayed to the user having the look and feel of the first server, despite using the authentication process of the second server. A method of dual or distributed authentication is also disclosed wherein the user need only to input the login id and password once and wherein the two authentication processes need not exchange the user's password.

7 Claims, 6 Drawing Sheets

IN-LINE SIGN IN

CROSS-REFERENCE TO RELATED APPLICATION

This application claims priority to U.S. application with Ser. No. 09/792,359 filed on Feb. 23, 2001.

TECHNICAL FIELD

The invention relates to computer networks. In particular, the invention relates to signing into a network server on the computer network.

BACKGROUND OF THE INVENTION

With the increasing popularity of the Internet, more network servers require users to sign in thereto. Signing in has numerous benefits for both the user and the network server. The network server benefits by gaining information about the user. Such information may include the user's email address, name, geographical region, and commercial and/or personal preferences, etc. Accordingly, the network server may use such information in a variety of commercially beneficial ways.

The user benefits by having a more dynamic and personalized user experience. In this sense, the network server, as presented to the user in the form of a web page, may have a different 'look and feel' or different advertising based on the user's preferences, past experiences, etc. Thus, the site displays information more relevant to the user.

At least in some instances, a network server (first network server), when signing in a user, chooses to use another network server's (second network server) sign in methodology. This alleviates the first network server from creating and maintaining its own sign in process and allows the second network server to generate revenue through licensing its sign in methodology. However, a user attempting to sign into the first network server which is using the sign in methodology of the second network server, has heretofore been presented with a sign in screen that has the look and feel of the second network server and not of the first network server. This unexpected and potentially misleading situation may be upsetting to the user and detracts from the first network server's user experience. As a result, such situation can deter the first network server from using the second network server's sign in methodology.

Therefore, a need exists for a method and an apparatus for allowing a first network server to use the functionality of a second server's sign in methodology yet still maintain the look and feel of the first server during such sign in. That is, a need exists for an 'in-line' sign in method.

To further such user experience, there is also a need for a method that allows any error messages to be displayed having the look and feel of the first server despite the error being generated in the second server.

Additionally, to facilitate the transition of a first server adopting the authentication methodology of the second server, there is a need for a dual authentication process that allows users to be authenticated at two servers yet only having to enter the user's login id and password once.

BRIEF SUMMARY OF THE INVENTION

The invention satisfies the aforementioned needs by providing a method of in-line sign in that allows a user to sign into a first server based on a sign-in methodology of a second server using, among other things, nonces and an approved URL list, while at the same time displaying any error message in the look and feel of the first server. Furthermore, the invention satisfies the aforementioned need by providing a dual authentication methodology (i.e. authenticating the user at two different servers) without the two servers ever exchanging the client's password and requesting the client input the client's login id and password only once.

In one embodiment of the invention, a method is provided for seamlessly authenticating a user to a first server by way of a second server. In the method, a user requests content from the first server and, in response, an authentication response is received from the first server. The authentication response includes a second address of the second server and an executable script, and a first address associated with the first server. Then, the client executes the executable script which includes issuing a request to the second server at the second address for state information corresponding to the user. The state information includes a nonce and a third address associated with second server. Then, after receiving the state information from the second server, the client forwards to the third address associated with the second server the nonce and the first address associated with the first server. Lastly, the client is authenticated by the second server based on the nonce and the first address. If the user is not authenticated to the second server, then a login module is displayed for collecting login information for authenticating the user to the second server, the login module being displayed with a view associated with the first server.

In another embodiment of the invention, and in furtherance of the seamless sign in process, a method of seamlessly displaying a message to a user while authenticating a user to a first server by way of a second server is disclosed. In the method, an error response is received from the second server, the response includes an error code and an instruction to return to the first server. The error code is then forwarded to the first server and an executable script is received from the first server. The error code is then forwarded to the second server and text associated with the error code is received from the second server. The client then executes the script and the error text is displayed in accordance with executable script provided by the first server.

In another embodiment of the invention, a method for authenticating a client computer system at two servers is disclosed. In the method, a first nonce is received from a first server and a second nonce is received from a second server. Then, a login id and password is entered and the client computer system computes a one way hash value using the password, the first nonce and the second nonce as inputs to the function. Then, the hash value, the first nonce and the second nonce are sent to the first server and an indication is received from the first server whether the user is authenticated at the first server. If so, the user proceeds within the first server and if not, the hash value, the first nonce and the second nonce are sent to the second server. An indication is received from the second server whether the user is authenticated at the second server.

BRIEF DESCRIPTION OF THE DRAWINGS

Other features of the invention are further apparent from the following detailed description of the embodiments of the present invention taken in conjunction with the accompanying drawings, of which.

DETAILED DESCRIPTION OF THE INVENTION

In the invention, methods and systems are described for providing a seamless login process for client attempting to login to a first server based on an authentication process of a second server. In particular, a user at a computing device requests content from a first server. The user first receives an authentication response from the first server. The authentication response from the first server includes an address of the second server and an executable script. The computing device of the user, typically through a web browser, parses the authentication response and, in doing so, executes the executable script. Executing the script includes issuing a request to the second server for state information and receiving the state information from the second server. After receiving such state information, the computing device/browser determines, based on such state information, whether the user is authenticated to the second server.

If the user is authenticated to the second server, the computer device/browser issues a request to the second server for vouching information for authenticating the user to the first server. If the user is not authenticated in the second server, the computer device/browser displays a login module for collecting login information for authenticating the user to the second server. Importantly, the login module is presented to the user within the context of the look and feel of the first server web page. Accordingly, the user is not upset by the sudden appearance of a foreign web page such as that from the second server.

Figure 1:
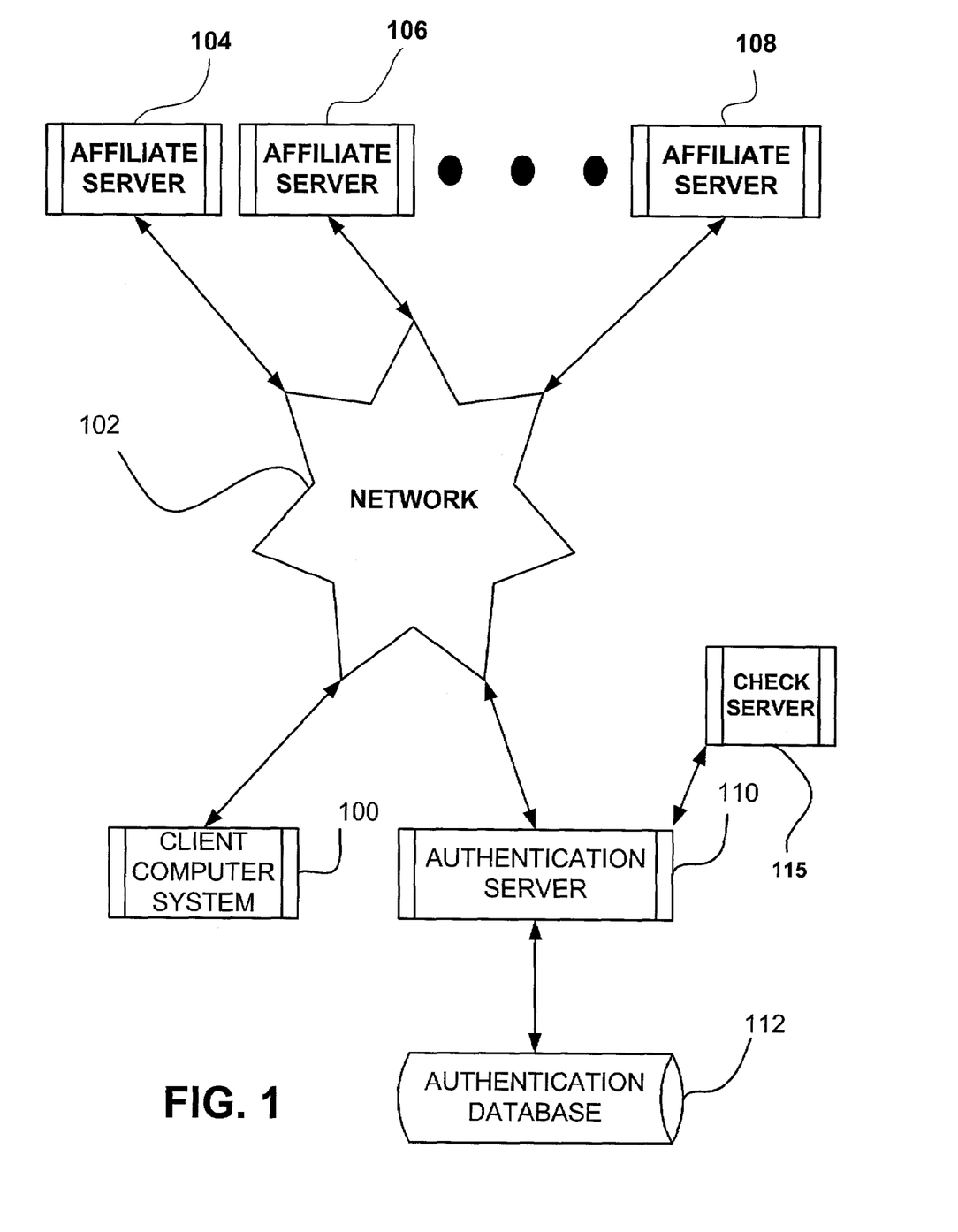
FIG. 1 is a block diagram of an exemplary networking environment in which aspects of the invention may be implemented.

FIG. 1 illustrates an exemplary network environment in which aspects of the invention may be implemented. A client computer system 100 is coupled to a network 102. In this example, network 102 is the Internet (or the World-Wide Web). However, the teachings of the invention can be applied to any data communication network. Multiple affiliate servers 104, 106, and 108 are coupled to network 102, thereby allowing a user at a computing device or user computer system 100 to access web servers 104, 106, and 108 via the network. Affiliate servers 104, 106, and 108 are also referred to as "web servers" and "network servers". An authentication server 110 is also coupled to network 102, allowing communication between the authentication server and user computer system 100 and web servers 104, 106, and 108. Although referred to as an "authentication server", authentication server 110 is also a web server capable of interacting with web browsers and other web servers. In this example, data is communicated between the authentication server, user computer system, and web servers using the Hypertext Transfer Protocol (HTTP), a protocol commonly used on the Internet to exchange information. Other protocols may be used without departing from the scope of the present invention.

An authentication database 112 is coupled to authentication server 110. The authentication database 112 contains information necessary to authenticate users and also identifies which elements of the user profile information should be provided to a particular affiliate server when the user accesses the affiliate server. Although the authentication database 112 is shown separately from the authentication server 110, in other embodiments of the invention, the authentication database 112 is contained within the authentication server.

The term "affiliate server" is defined herein as a web server that has "registered" or otherwise established a relationship or affiliation with the authentication server 110. Each affiliate server 104, 106, and 108 includes a code sequence (not shown) that allows the affiliate server to share information with the authentication server 110 when a user (who is also registered with the authentication server) requests access to the affiliate server. Each affiliate server is assigned a unique ID, which the affiliate server transmits to the authentication server, thereby identifying itself to the authentication server.

Figure 2:
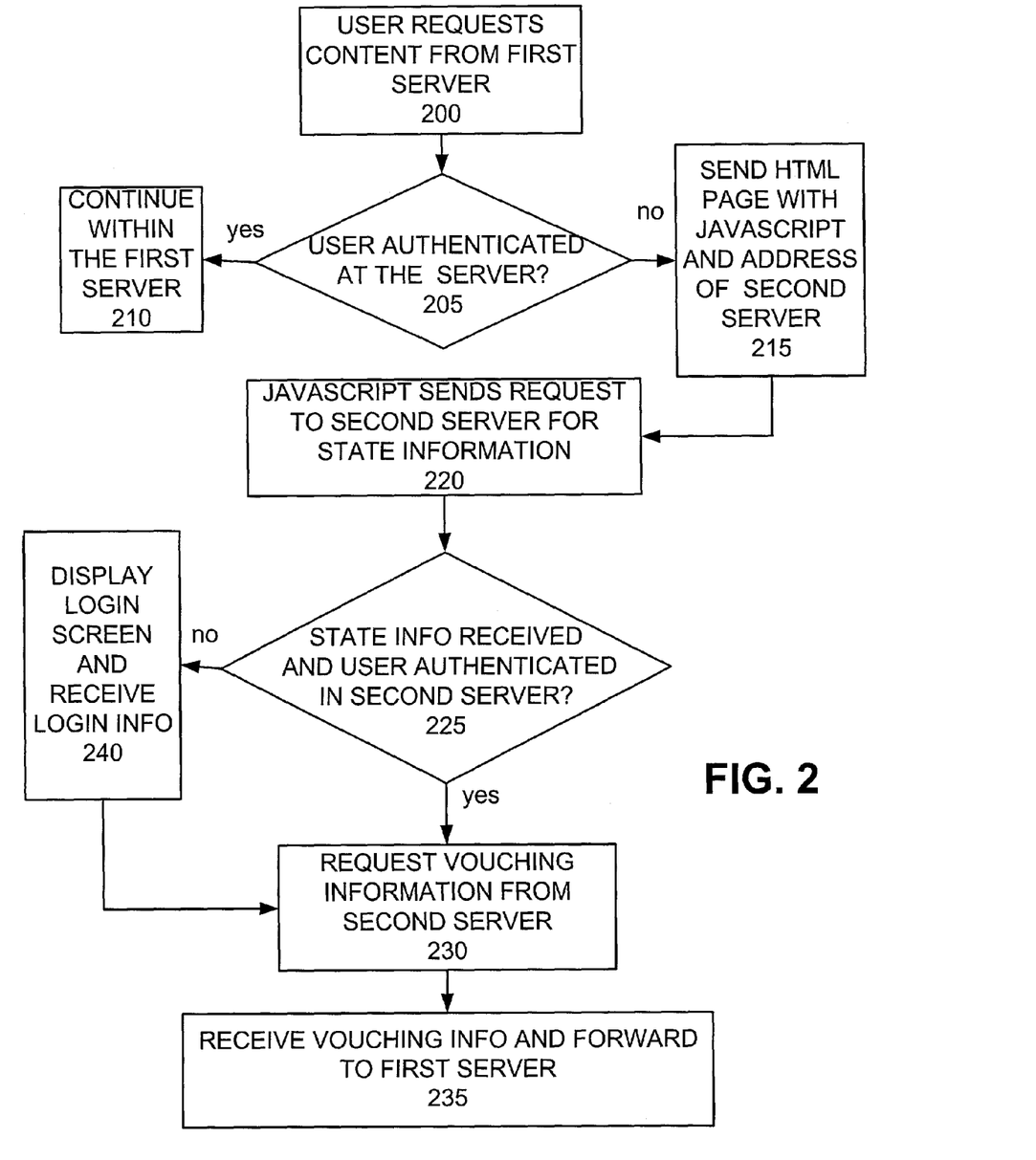
FIG. 2 is a flowchart illustrating the process of a user signing in to a first server using the authentication methodology of a second server in accordance with one embodiment of the invention.

FIG. 2 is a flowchart illustrating the process of a user signing in to an affiliate server 104 using the authentication methodology of an authentication server 110 in accordance with the present invention. According to the present invention, at step 200, a client requests content from the affiliate server 104. Typically, content is requested by the user at the computer system 100 by either typing a URL of a network server or clicking on a hyper link associated with such URL.

The affiliate server 104 determines locally whether the user is already authenticated at such affiliate server 104 at step 205. In one embodiment of the present invention, if the user is authenticated at the affiliate server 104 using the authentication methodology of the affiliate server 104, the user may access the affiliate server 104 at step 210. However, if the user is not authenticated at the affiliate server 104, the affiliate server 104, in response to the user's request for content, sends the user's computer system an authentication response at step 215.

The authentication response may be in the form of an HTML page or a portion thereof, and may include, in pertinent part, a JavaScript tag and at least one executable script. The JavaScript tag includes an address of the authentication server 110 (whose authentication methodology is to be used by the affiliate server 104) having state information concerning the user. The at least one executable script may include or refer to an Application Program Interface (API) provided to the affiliate server 104 by the authentication server 110 and may contain at least one information segment. The information segment receives the state information for the user from the authentication server as will be described below.

After receiving the authentication response, the browser or the like on the user's computer system parses the authentication response. In doing so, at step 220, the browser encounters the JavaScript tag that directs the user's computer system 100 to the authentication server 110 to retrieve state information concerning the user. At this point, the computer system 100 passes state information to the authentication server 110. The state information is retrieved from the authentication server 110 and is sent to the user's computer system 100. The user's computer system 100 at step 225 receives such state information from the authentication server 110 and appropriately places the state information in the information segments in the executable script.

Importantly, and in accordance with one embodiment of the present invention, the affiliate server 104 incorporates the JavaScript tag and the executable scripts into the authentication response in any manner. In particular, the authentication response from the affiliate server 104 may be embodied within a web page having the look and feel of the affiliate server 104, even though information is being sent to and received from the authentication server 110. Thus, the affiliate server 104 can use the functionality of the authentication methodology of the authentication server 110, in any manner desired. To the user, the user experience does not change because the affiliate server 104 always maintains control of the user experience through the HTML page. As a result, a seamless sign-in process is provided to the user, i.e. the user is not displayed a screen from the authentication server 110 having a different look and feel. Therefore, to the user, it appears that the user's computer system 100 never left the affiliate server 104 even though the user's computer system 100 has contacted the authentication server 110 and employed the authentication methodology thereat on behalf of the affiliate server 104.

After the computer system 100 receives the state information from the authentication server 110, the browser of the computer system 100 executes the executable script using such state information. In one embodiment of the present invention, the executable script employs the received state information as input to functions associated with the aforementioned API's, where the functions result in an output that signifies whether the user is indeed authenticated by the authentication server 110. Such authentication is described more fully in U.S. patent application Ser. Nos. 09/349,619 and 09/350,018, which are hereby incorporated by reference in their entirety. Notably, an appropriate authentication process may be employed by the authentication server 110 and the executable script at the computer system 100 without departing from the scope of the present invention.

In one embodiment of the present invention, if the browser of the computer system 100 determines the client is indeed authenticated, the executable script may direct the user computer system 100 to the authentication server 110 to retrieve vouching information at step 230. The vouching information serves to represent to the affiliate server 104 that the user is in fact authenticated by the authentication server 110. In one embodiment, the vouching information is written by the authentication server 110 according to a secret shared with the affiliate server 104. The secret may be any appropriate secret without departing from the scope of the present invention.

Upon receipt of the vouching information, the browser of the computer system 100 forwards the same to the affiliate server 104 at step 235. As may be appreciated, the affiliate server 104 employs the vouching information and the secret shared with the authentication server 110 to read the vouching information and after doing so the affiliate server 104 in fact signs in the user thereto. The aforementioned U.S. patent application Ser. Nos. 09/349,619 and 09/350,018, already incorporated by reference herein, describe the process as performed by the affiliate server 104 in more detail.

If the user is not authenticated at the authentication server 110, the executable script may direct the user computer system 100 to display a login screen for the user to input user information with regard to such authentication server 110, as at step 240. As may be appreciated, the inputted user information includes such items as a user identification and password with regard to the authentication server 110, and is forwarded by the browser on the computer system 100 to the authentication server 110.

The computing device 100 may then receive an acknowledgement from the authentication server 110 that the user is authenticated to the authentication server 104. In one embodiment the present invention, the acknowledgement is in the form of cookies or the like. However, other forms of acknowledgement may be used without departing from the scope of the present invention. Thereafter, the browser of the computer system 100 may direct the user computer system 100 to the authentication server 110 to retrieve vouching information and forwards the same to the affiliate server 104, in the manner of steps 230 and 235 as discussed above, and the affiliate server 104 signs in the user thereto. Once the user is logged into the authentication server 110, the affiliate server 104 may then send the content to the user in response to the user's original request.

Figure 3:
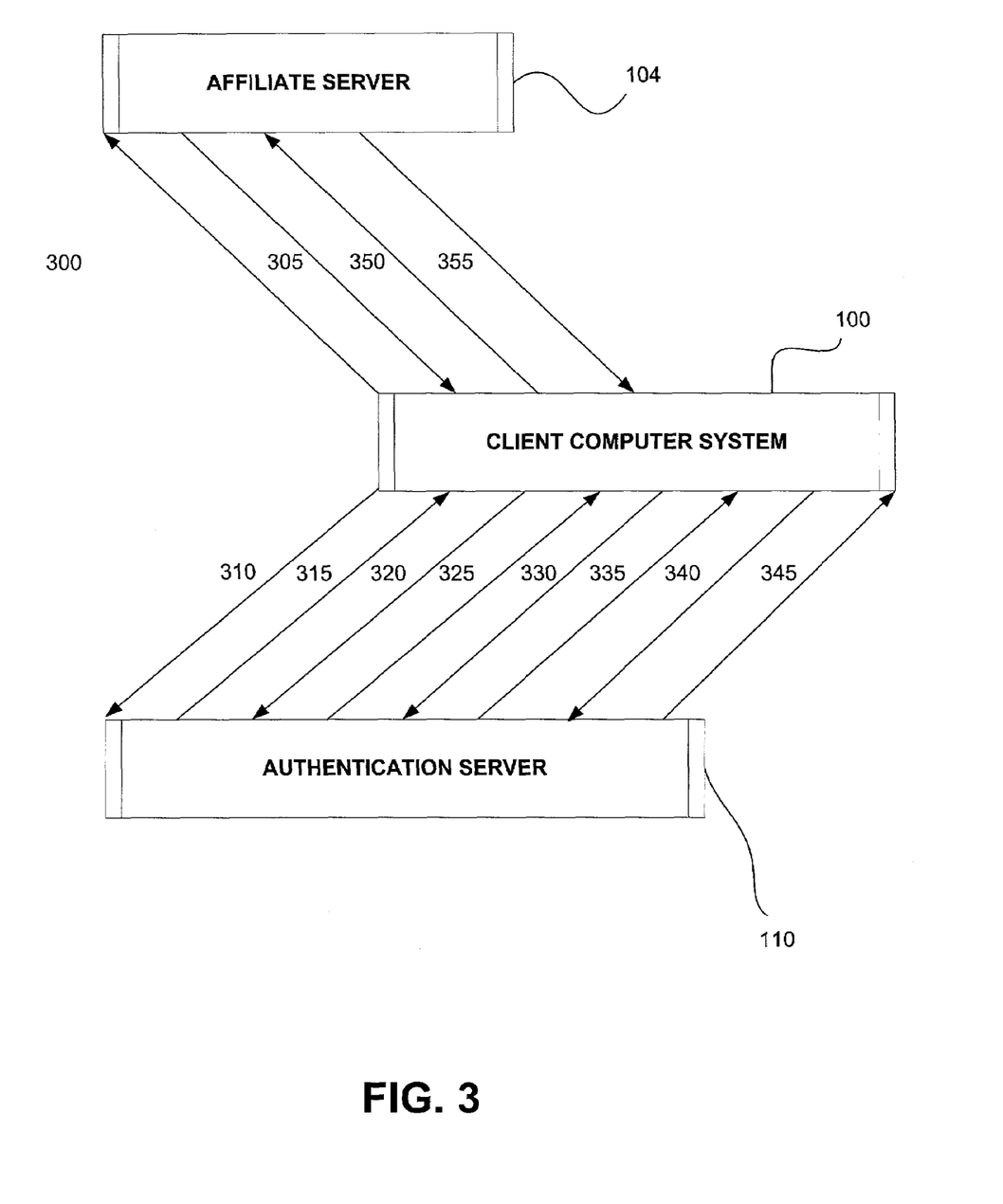
FIG. 3 is a block diagram illustrating the process of a user signing in to an affiliate server using the signing in methodology of an authentication server in accordance with one embodiment of the invention.
Figure 4:
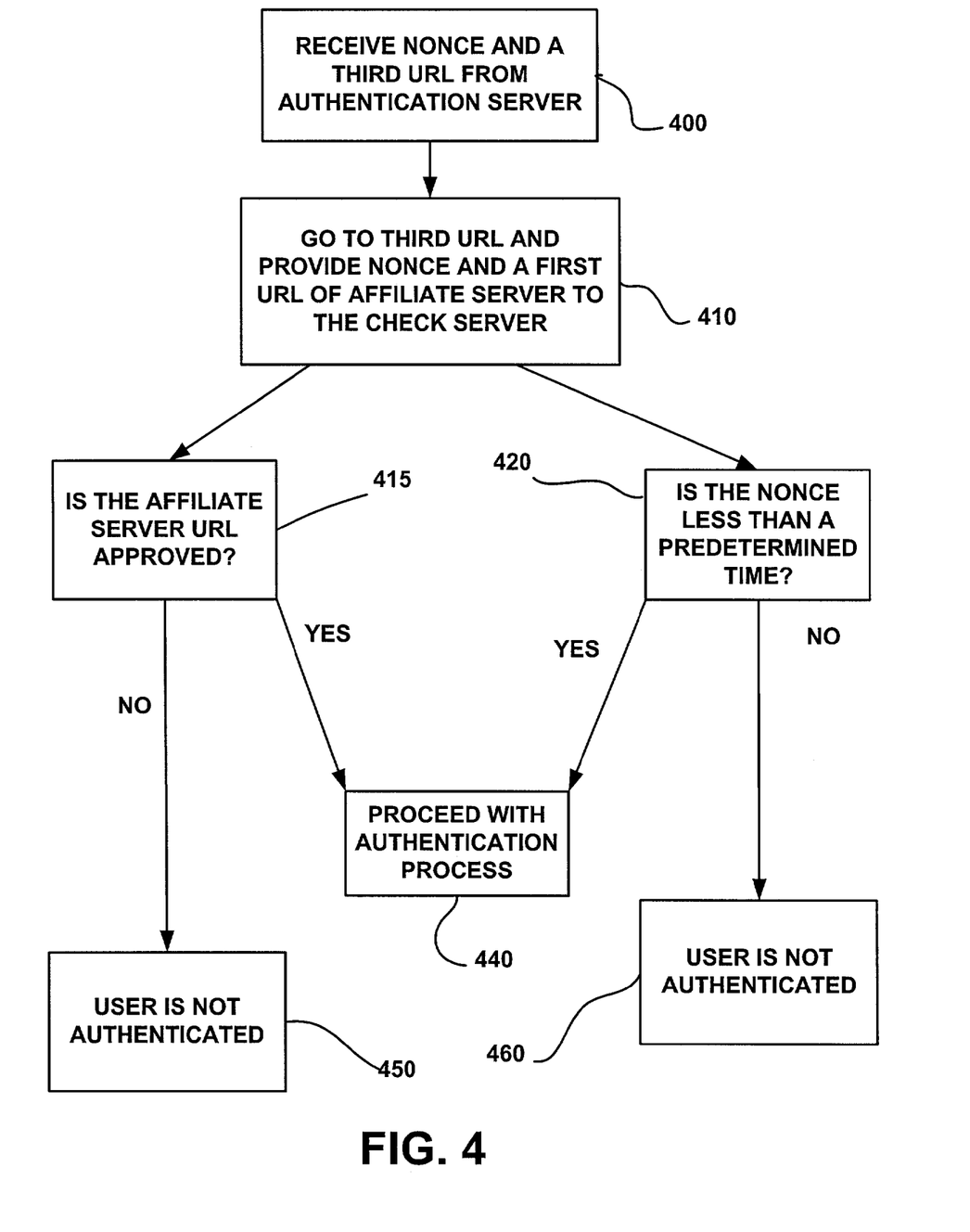
FIG. 4 is a block diagram illustrating an authentication method that uses nonces and an approved URL list is accordance with the invention.

FIG. 4 is a block diagram illustrating another embodiment of the invention. In this embodiment, an additional level of authentication assurance is provided using nonces and specific URL approval. Similar to the above process, the client request content from a first or affiliate server and the server sends the client an authentication response which includes a first address associated with the affiliate server, an executable script and a second address associated with an authentication or second server. The client then executes the executable script, and, in doing so, issues a request to the second address associated with the second server for state information. The client then receives state information. Specifically, in this embodiment of the invention, and at step 400, the state information provided at step 315 in FIG. 3 includes a nonce and a third URL.

In one embodiment, the third URL is within the domain of the authentication server and is a check server 115 associated with the authentication server. The third URL, however, may be any URL within any domain without departing from the scope of the invention. In this manner, the client computer system 100 then is redirected to the check server at the third URL.

At step 410, the client goes to the third URL. Thereat, the client computer system 100 provides the generated nonce and the URL of the affiliate server the client computer system is trying to access for content at step 400. The authentication server, at the check server, then authenticates the client computer system using the nonce and the affiliate's URL. In this manner and in one embodiment of the invention, the check server authenticates the user based on the nonce. For example and in this embodiment, the nonce is a timestamp. The server authenticates the user by generating an elapsed time at step 420, i.e. the time that has elapsed since the timestamp was generated. Then, the authentication server may compare the time elapsed to a predetermined time set by the authentication server and, if the time elapsed is less than the predetermined time, the client computer system may continue with the authentication process. In this manner, the client may proceed with step 230 of the authentication process as described above and in FIG. 2.

Conversely, if the time elapsed is greater than the predetermined time, the client computer system is not allowed to proceed with the authentication process and an appropriate message may be displayed on the client computer system at step 460.

Alternatively, in another embodiment of the invention, another type of nonce may be used, such as, for example, a web counter. In this manner, the client computer system may receive a nonce in the form of a web counter at step 400. In this example, the client may be authenticated if the web counter is between two numbers.

Additionally, as another level of authentication assurance, the authentication server uses the URL of the affiliate server that the client computer system is trying to access to ensure that the affiliate server is an approved affiliate server. In one embodiment, the authentication server compares the URL of the affiliate server to a list of approved affiliate servers at step 415. If the URL provided by the client computer system matches one of the URL's in the list of approved affiliate servers, then the client computer proceeds with the authentication process. In this manner, the client may proceed with step 230 of the authentication process as described above and in FIG. 2.

If the URL provided by the client computer system does not match one of the URLs in the list of approved affiliate servers (for example, the list of affiliate servers is located in the authentication database 112), then the client computer may not proceed with the authentication process and an appropriate message is displayed on the client computer systems at 450.

Such an additional level of authentication prevents a server that is not an affiliate server from wrongly using the authentication server's authentication methodology. In this manner, only those affiliate servers listed in the approved list may use the authentication methodology of the authentication server.

Furthermore, by using nonces, such an authentication methodology prevents replay attack. Replay attack occurs, for example, when a client leaves a computer system while logged in and authenticated, and another user uses the computer system that the previous user was using. By using nonces, the authentication method prevents such occurrences by requiring that the nonce on the client computer is less than a predetermined time. Such predetermined time may be any time without departing from the principles of the invention. In one embodiment of the invention, the predetermined time is five minutes.

Figure 5:
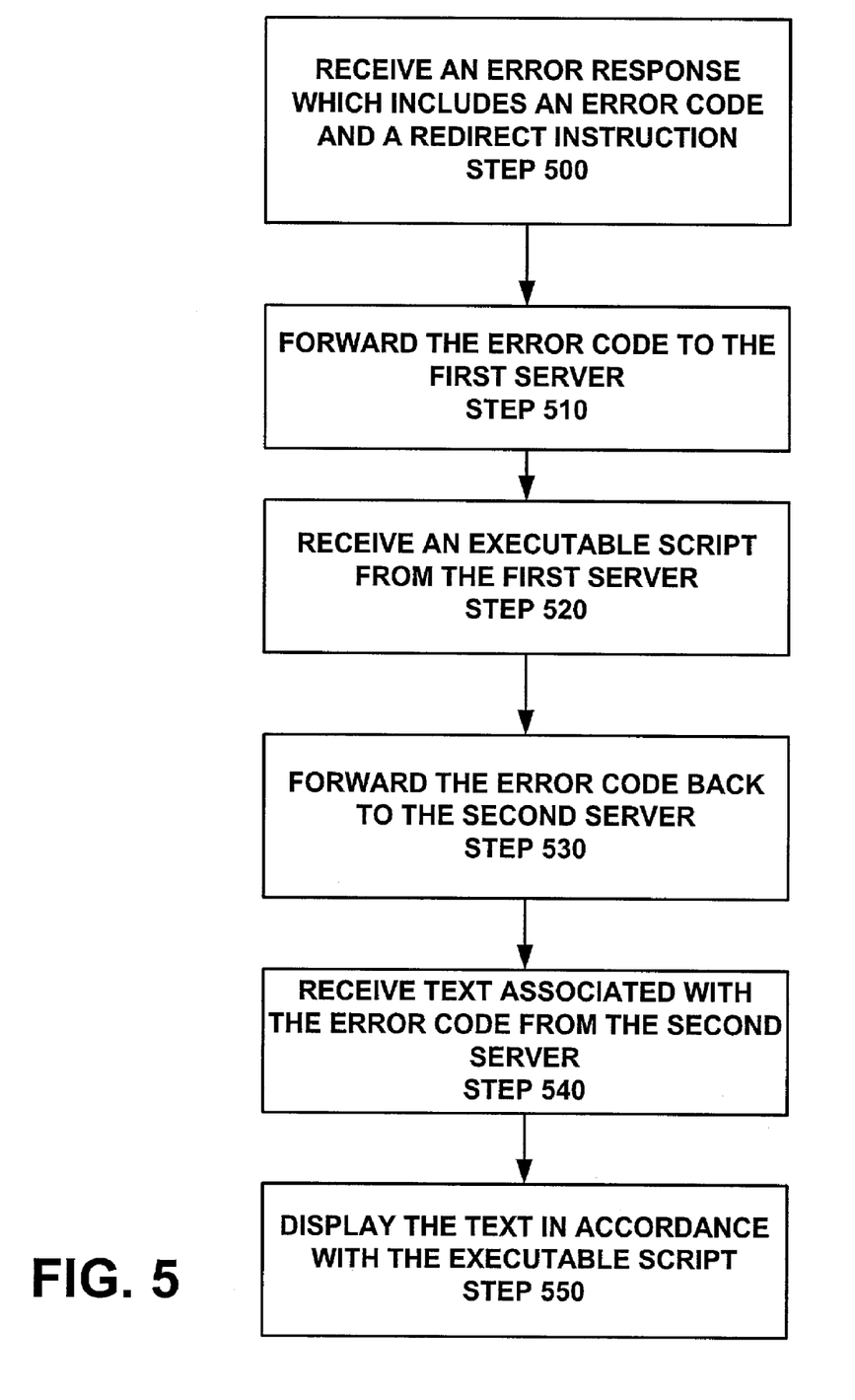
FIG. 5 is a block diagram illustrating a method of displaying an error message in accordance with one embodiment of the invention.

FIG. 5 is a block diagram illustrating a method of displaying an error message in accordance with one embodiment of the invention. In this embodiment, to more fully effectuate a seamless experience for the user, any error that may be generated during the sign-in process may also be displayed with the look and feel of the user experience associated with first server. Consequently, not only does the login screen have the look and feel of the affiliate server but so does any error screen that may be generated during the sign-in process. As such, should an error message arise in the context of the user being authenticated, the user is not confused by an error message having the look and feel of the authentication server.

For example, during the authentication process, an error may be generated if the user enters a password that does not match the user's id. Typically, the an error is generated as a error code which represents error text. As such, if the error message is displayed to the user having the look and feel of the second or authentication server, the user experience may be disrupted because the user does not know that the authentication means of the authentication server are being used.

Turning now to FIG. 5, to facilitate the seamless display of an error message, if an error message is generated during the authentication process, the authentication server sends to the client computer system an error code and a redirect instruction to return to a particular URL associated with the affiliate server at step 500. The error code generated by the authentication server corresponds to an error text message. In turn and in response to the redirect instruction, the client computer system sends the error code back to the affiliate server at step 510. The affiliate server then returns to the client computer system a new executable script in a similar manner at 520 as described above. This new executable script, however, contains the error code as well as instructions to return to the authentication server.

The client computer system then returns to the authentication server with the error code in accordance with the new executable script at step 530. The authentication server then provides to the client computer system a text error message that corresponds to such error code at step 540. The client computer system then inputs the text error message into the executable script from the affiliate server. In this manner, the text error message is displayed on the client computer system according to the look and feel of the affiliate server as prescribed by the executable script. As such, because the affiliate server has control over the executable script provided to the client computer system, the affiliate server constructs the script to display the error text in a manner consistent with any other affiliate server web pages. Also, because only the authentication server can provide the error text associated with the error code, the authentication server provides the client with the error code, and then any associated text.

Figure 6:
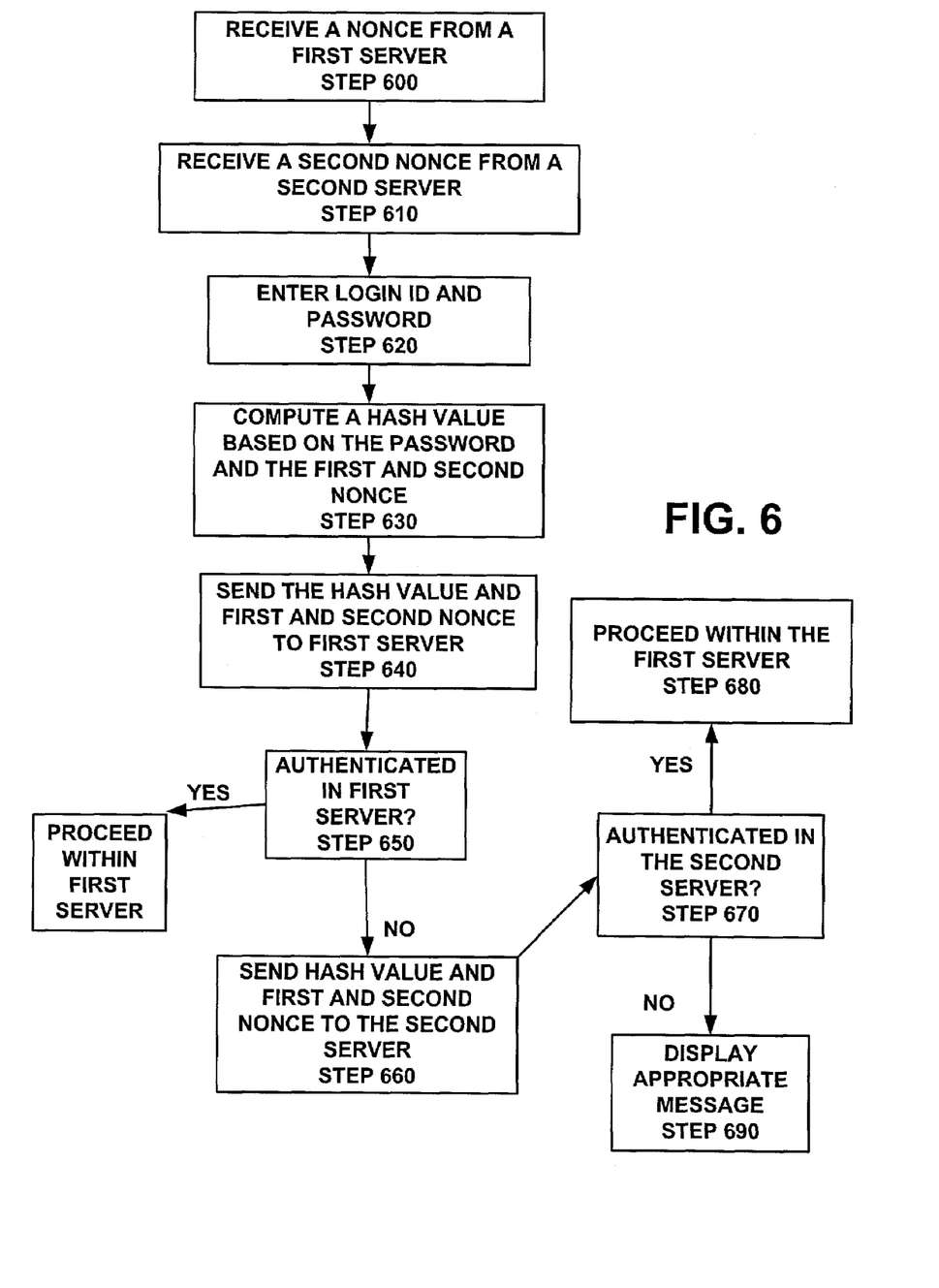
FIG. 6 is a block diagram illustrating a dual authentication method in accordance with one embodiment of the invention.

FIG. 6 is a block diagram illustrating a dual authentication method in accordance with one embodiment of the invention. A user visiting an affiliated server may have the option of logging in either directly via the affiliate server or indirectly via the authentication server, or perhaps even other servers. To prevent the user from entering a login ID and password multiple times, the method of the present embodiment collects such information only once. However, and importantly, the password in particular is not sent directly to any server. Thus, if for example, the password for the authentication server is entered, the affiliate server is not exposed to the user's password in the authentication server.

Furthermore, in this embodiment of the invention, in an attempt to further facilitate the affiliate's server adoption of the authentication server's authentication process, a dual or distributed authentication methodology is disclosed. In other words, both the authentication server and the affiliate server may authenticate the user using a single authentication process as observed by the user. As such, an affiliate server may be more inclined to adopt an authentication means of another server if, at first, the affiliate server may implement a dual authentication system in which the affiliate server may test the authentication means of the authentication server while still using its own existing authentication process to ensure proper authentication of its users.

In this embodiment, and referring to FIG. 6, the user visits an affiliate server's website and is prompted to enter a login id and password. In accordance with the invention, the user may enter a login id and password associated with either the authentication server or the affiliate server. In doing so, the affiliates server passes to the user a one way hash function, a first nonce and a re-direction instruction to go to the authentication server at step 600. Generally, the hash function is an algorithm that turns a variable-sized amount of text into a fixed-sized output (hash value) and may be any hash function without departing from the scope of the invention. At the authentication server, the user collects a second nonce and a re-direction instruction back to the affiliate server where the user is asked to provide a login id and password at steps 610 and 620. The user then inputs the login id and password. Again, the user may enter a login id and password associated with either the authentication server or the affiliate server.

In one embodiment, the login id and password screen has the look and feel of the affiliate server in accordance with the embodiment as described above. However, such dual authentication method need not necessarily incorporate the in-line sign in process as described above. Thereafter, the client computer system computes a first hash value with the hash function based on the entered password, the first nonce and second nonce at step 630.

The first hash value, the first nonce, the second nonce and the login id are then sent from the client computer system 100 to the affiliate server at step 640. First, the affiliate server checks an appropriate database or the like to determine if the login id from the client computer system is therein. If the login id is not within the affiliate server, the affiliate server then directs the client computer system to the authentication server.

Assuming the affiliate server finds the login id, the affiliate server also retrieves the password that matches the user name from a database of passwords. After the affiliate server has retrieved the password that matches the login id, the affiliate server computes a second hash value using the retrieved password, the sent first nonce and the sent second nonce at step 650. The second hash value is then compared to the first hash value. If the first hash value matches the second hash value, the user is authenticated and may proceed within the affiliate server.

If the first hash value does not match the second hash value, the affiliate server instructs the client computer system to go the authentication server. In this manner, the client computer system is directed to the authentication server and forwards to the authentication server the hash value computed at the client computer system, the first nonce, the second nonce and the login id at step 660.

Then, the authentication server performs the same steps the affiliate server performed above. That is, first the authentication server finds the login id and matching password from a database of login id's and passwords at step 670.

Upon finding the matching password, the authentication server then computes a third hash value using the password retrieved from its database, the sent first nonce and the sent second nonce and the same hash function. If, the third hash value does not equal the first hash value, the user is not authenticated and an appropriate message is displayed at step 690. If the result of the third hash value is the same as the first hash value, then the client is authenticated with the authentication server. Consequently, the user has entered the password only once even though the user has been authenticated in two different servers.

Once authenticated in the authentication server, the authentication server passes to the client any form of vouching information, and the client, in turn, passes such information to the affiliate server. Such vouching information conveys to the affiliate server that the client has been authenticated at the authentication server. The client may then proceed within the affiliate server at step 680.

Of note, the aforementioned dual authentication process does not entail the authentication server and the affiliate server sharing a client's password. In this manner, the one way hash as used in the invention allows for the dual authentication of a user without the client's password ever leaving the domain of the server for which the password is used. Consequently, such dual authentication process is a relatively safe and seamless process.

In another embodiment of the present invention, the dual authentication process as described above and illustrated in FIG. 6 may be used without receiving the nonces and subsequently using them to compute a hash value. In this manner, the hash function may be computed using the password and not the nonces. It is appreciated that using the nonces prevents replay attack and the like, however, by computing the hash value based on the password and not the nonces, the process remains a relatively safe dual authentication process. Specifically, the user may still be authenticated in two or more servers without the server's ever exchanging the user's password.

In one embodiment of the present invention, the hash function is supplied to the affiliate server from the authentication server. However, it is appreciated that this embodiment of the invention may work irregardless of the source of the hash.

In one embodiment of the invention, the dual authentication process may occur using the seamless login process as described above. In this manner, the user's credentials (user name and password) are tried by both authentication processes such that an affiliate server can seamlessly allow its users to sign-in without any degradation from the affiliate server's user experience while at the same time performing dual authentication processes. For example, the client may enter the user name and password using the method as described above i.e. entering the user name and password into a login screen having the look and feel of the affiliate server. Then, without disturbing the look and feel of the affiliate server's user experience, the user may be safely authenticated in two different servers without the server's ever exchanging the user's password.

Again in another embodiment of the invention, should any error occur in the dual authentication process as described above, the error may be displayed to the user having the look and feel of the affiliate server. As such, should an unforeseen error occur during the authentication process in the authentication server, the user will be presented with an error having the look and feel of the server that the user is trying to access.

It is contemplated, however, that the dual authentication as described above can occur without using the seamless sign-in process as described. As such, the scope of dual authentication process should be defined using the appended claims.

In another embodiment of the invention, the client may be tried at numerous other servers in accordance with the invention. Specifically, provided that such other servers have the same hash function as the user, the authentication server and the affiliate server, the invention could be implemented using numerous servers without departing from the scope of the invention.

What is claimed is:

1. A method of seamlessly authenticating a user to a first server by way of a second server, the method comprising:
   requesting content from the first server;
   receiving an authentication response from the first server, the authentication response including a first address associated with the first server and an executable script, and a second address associated with the second server;
   executing the executable script, including:
     issuing a request for state information to the second server at the second address, whereby the state information includes a nonce and a third address associated with the second server;

receiving the state information from the second server;

forwarding the nonce and the first address to the third address whereby a determination is made whether the user is authenticated based on the nonce and the first address; and if not, displaying a login module for collecting login information for authenticating the user in the second server, the login module being displayed with a view associated with the first server and;

if so, allowing the user to proceed in the first server, wherein determining, based on the state information, whether the user is authenticated to the second server comprises comparing the first address associated with the first server to a list of pre-approved servers.

2. The method of claim 1, further comprising:

issuing a request to the second server for vouching information;

receiving the vouching information from the second server; and forwarding the vouching information to the first server.

3. The method of claim 1, wherein the login module is displayed according to information received with the authentication response from the first server.

4. The method of claim 1, wherein issuing a request to the second server comprises issuing a request to the second server for state information wherein the state information includes a timestamp and a third address associated with the second server.

5. The method of claim 4, wherein the second server determines whether the user is authenticated based on the timestamp and the first address comprises calculating an elapsed time based on the nonce and comparing the time elapsed to a predetermined time.

6. The method of claim 1 comprising forwarding the nonce and the first address to a third address associated with a third server.

7. A computer-readable medium having computer-executable instructions to perform the method of claim 1.

* * * * *